US006757956B2

(12) United States Patent
Koch et al.

(10) Patent No.: US 6,757,956 B2
(45) Date of Patent: Jul. 6, 2004

(54) SYSTEM AND METHODS FOR CONSTRUCTING BOX SPRING/ FOUNDATION FRAMES

(75) Inventors: Mark A. Koch, Arvada, CO (US); Fedor Y. Belits, Aurora, CO (US)

(73) Assignee: Denver Mattress Co., LLC, Lakewood, CO (US)

( * ) Notice: Subject to any disclaimer, the term of this patent is extended or adjusted under 35 U.S.C. 154(b) by 94 days.

(21) Appl. No.: 10/080,382

(22) Filed: Feb. 21, 2002

(65) Prior Publication Data

US 2003/0154589 A1 Aug. 21, 2003

(51) Int. Cl.[7] ............................ B23P 11/00; B23Q 3/00

(52) U.S. Cl. ........................ 29/432; 29/464; 29/525.01; 29/281.1; 269/40

(58) Field of Search .......................... 29/772, 464, 432, 29/525.01, 798, 281.1, 281.5; 269/36, 40, 900, 910, 303; 5/246, 248, 245

(56) References Cited

U.S. PATENT DOCUMENTS 1,549,671 A * 8/1925 Kridler et al. .............. 269/910
3,101,939 A * 8/1963 Richter ........................ 269/40
3,340,913 A * 9/1967 Gustafson .................. 29/281.1
3,789,495 A * 2/1974 Stumpf ........................ 29/429
3,958,284 A * 5/1976 Jureit et al. .................. 5/200.1
3,967,331 A * 7/1976 Glassman ...................... 5/246
4,077,106 A * 3/1978 Lichtenstein et al. ......... 29/772
4,492,016 A * 1/1985 Smets et al. .................. 29/432
4,495,023 A * 1/1985 Lisec ........................ 29/281.1
4,546,528 A * 10/1985 Langas .................... 29/243.56
4,724,590 A * 2/1988 Langas et al. ................. 29/91
4,815,182 A * 3/1989 Langas et al. ................. 29/91
4,829,643 A * 5/1989 Langas et al. ................. 29/91
4,845,824 A * 7/1989 Ishikawa et al. ......... 29/243.57
4,998,336 A * 3/1991 Papsdorf ...................... 29/432
5,355,575 A * 10/1994 Self ............................ 29/432
5,438,716 A * 8/1995 Dabney ...................... 29/91.1
5,459,892 A * 10/1995 Wells et al. ................... 5/246
5,701,653 A * 12/1997 Rupe ........................... 29/432
6,374,495 B1 * 4/2002 Lackler et al. ........... 29/243.56
6,499,206 B1 * 12/2002 Eure et al. .................... 29/432

* cited by examiner

*Primary Examiner*—David P. Bryant
(74) *Attorney, Agent, or Firm*—Townsend and Townsend and Crew LLP

(57) ABSTRACT

A method for constructing a box spring/foundation frame utilizes a template that is angled relative to and spaced above the ground. A plurality of frame elements are placed on the template, and a fastening machine is manually operated to attach the frame elements together with fasteners to form the frame.

18 Claims, 4 Drawing Sheets

SYSTEM AND METHODS FOR CONSTRUCTING BOX SPRING/ FOUNDATION FRAMES

BACKGROUND OF THE INVENTION

This invention relates generally to the field of frames, and in particular to the field of frames that support bed mattresses. More specifically, the invention relates to systems and methods for constructing so-called box spring/ foundation frames.

Box spring/foundation frames are typically constructed of a wire grid that is positioned on top of a wooden frame. Traditionally, such frames have been constructed by laying boards on a horizontal template and then manually nailing the boards together. To do so, one or more workers leans over the template in order to nail the boards together. Once completed, the worker again leans over the template to lift the frame. In so doing, the worker is continuously subjected to inefficient ergonomic positions. As such, the worker's back and joints may become overworked and sore.

At least one system has attempted to automate such a process by coupling a set of nail guns to a robotic arm that moves across the template so that a worker is not required to lean over the template when nailing the boards together. However, such automation may actually increase fabrication times since human workers can operate faster than the robotic arm.

Hence, this invention is related to systems and methods for constructing box spring/foundation frames in an ergonomically friendly manner. The systems and methods are also designed to be economically efficient.

BRIEF SUMMARY OF THE INVENTION

In one exemplary embodiment, the invention provides a system for constructing box spring/foundation frames and frame assemblies. The system comprises a base and a template that is coupled to the base. The base holds the template above the ground and at an angle relative to the ground. Further, a suspension system is provided to suspend a fastener machine in front of the template. In use, a worker places a set of frame elements, such as wooden boards, onto the template, grasps the fastener machine, and moves the fastener machine to various locations on the frame elements to join the frame elements with fasteners. By angling the template, the template is still able to hold the frame elements while also permitting the worker to stand generally upright when operating the fastener machine. In this way, the worker is maintained in an ergonomically friendly orientation while still permitting the worker to quickly fasten together the frame elements.

In one aspect, the suspension system includes a tether that is coupled to the fastener machine and a counter weight or counter balance. In this way, the weight of the fastener device in the worker's hands is significantly reduced. This permits the worker to more quickly complete the job and lessens the stress on the worker's arm, shoulder and back.

In another aspect, the fastener machine may comprise a nail gun that shoots nails into the frame elements using a pressurized gas, such as compressed air. With such a configuration, the worker may simply orient the gun in front of their torso and pull a trigger to shoot a nail into the frame elements.

The template may be constructed of a back plate and a plurality of template elements extending from the back plate. These template elements define slots into which the frame elements are placed. As one example, the frame elements may be both horizontally and vertically oriented on the template. Further, the angle of the template relative to the ground may be in the range from about 50° to about 80°, and preferably being about 69°.

In another exemplary embodiment, a grid may be coupled to the frame following attachment of the frame elements to form a frame assembly. Conveniently, the grid may be overlaid on the frame while the frame remains on the template (the same template where the frame was constructed or another template). The template may include protruding bars upon which the grid rests. Another fastener machine, such as a pole gun, may then be used to couple the grid to the frame.

DESCRIPTION OF THE SPECIFIC EMBODIMENTS

In one aspect, the invention provides a template that may be used to construct various components of a box spring/ foundation frame. For example, the template may be used to construct a wooden frame as well as to couple a wire or other grid to the frame. The template is held above the ground and at an angle relative to the ground. The height of the template is preferably within a working range of the worker. This may be, for example, at a level of the worker's waist to about the worker's head. For instance, the height of the bottom of the template may be within the range from about 10 inches to about 40 inches relative to the ground. This height permits the worker to vertically stand while constructing the frame.

The angle of the template is selected such that the components of the frame remain on the template without needing to actively couple or secure the components to the template while also being sufficiently vertical so that the worker does not need to lean over when working. For example, the angle of the template may be in the range from about 50° to about 80° relative to the ground. With such an angle, the worker may quickly add the frame elements to the template and then quickly remove the frame once completed.

The invention may also suspend a fastening machine or tool in front of the template with a tether. In this way, the tool is held within the working range of the worker. As such, the worker can quickly fasten the various components on the template while standing vertical and while holding the tool in front of himself. In this manner, the worker may quickly construct the frame while standing in an ergonomically friendly stance.

A variety of tools may be suspended in front of the template. These may include, for example, staple guns, nail guns, screw guns, glue applicators, and the like. Since many of these tools may be relatively heavy, a counter weight or balance may be coupled to the tether so the weight of the tool in the worker's hand is reduced.

Figure 1:
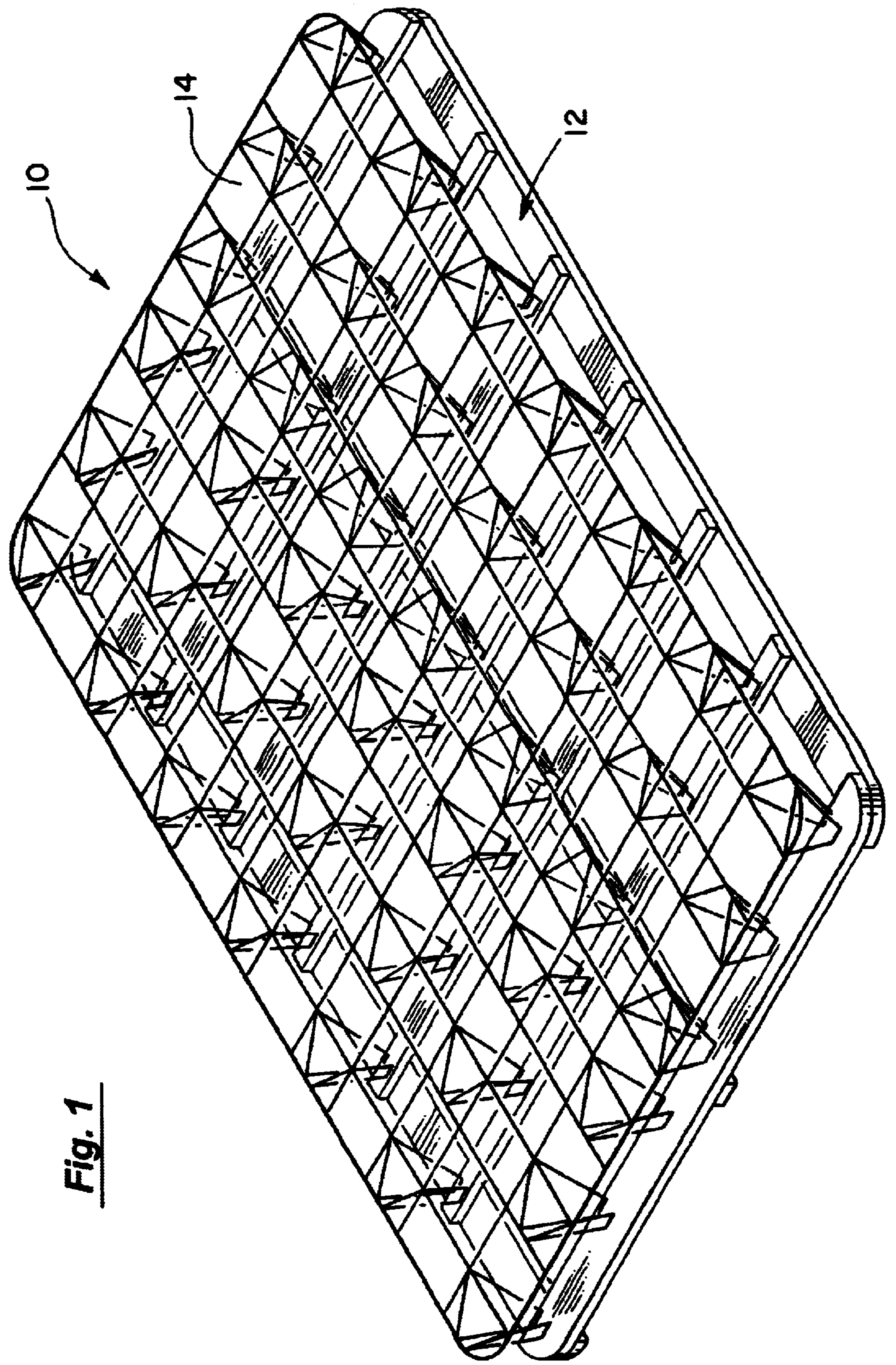
FIG. 1 is a perspective view of one embodiment of a frame and a grid coupled to the frame according to the invention.

Referring now to FIG. 1, one embodiment of a frame assembly 10 will be described. Frame assembly 10 is constructed of a wooden frame 12 that is coupled to a wire grid 14. As described hereinafter, frame 12 is first constructed and then grid 14 is coupled to frame 12. Frame 12 is constructed of a plurality of boards 16 that are fastened together. As shown, one set of boards 16 is perpendicular to another set. However, it will be appreciated that other orientations may be used as well. Further, although shown as wooden boards, it will be appreciated that other materials may also be used. Boards 16 may be connected to each other using a variety of fasteners, such as by nails, staples and the like using a variety of tools.

Grid 14 is constructed of steel and is coupled to frame 12 by a set of fasteners, such as staples, nails, and the like. Conveniently, these fasteners may be applied using a pole gun that is long enough to access frame 12 through grid 14. After grid 14 is coupled to frame 12, an insulating pad may be coupled to grid 14 using, for example, hog rings. A cover may then be placed over the pad and sides of the grid. Once the foundation is turned over, the cover may be stapled to the frame and a dust cover may also be stapled to the frame to form a box spring/foundation frame.

Figure 2:
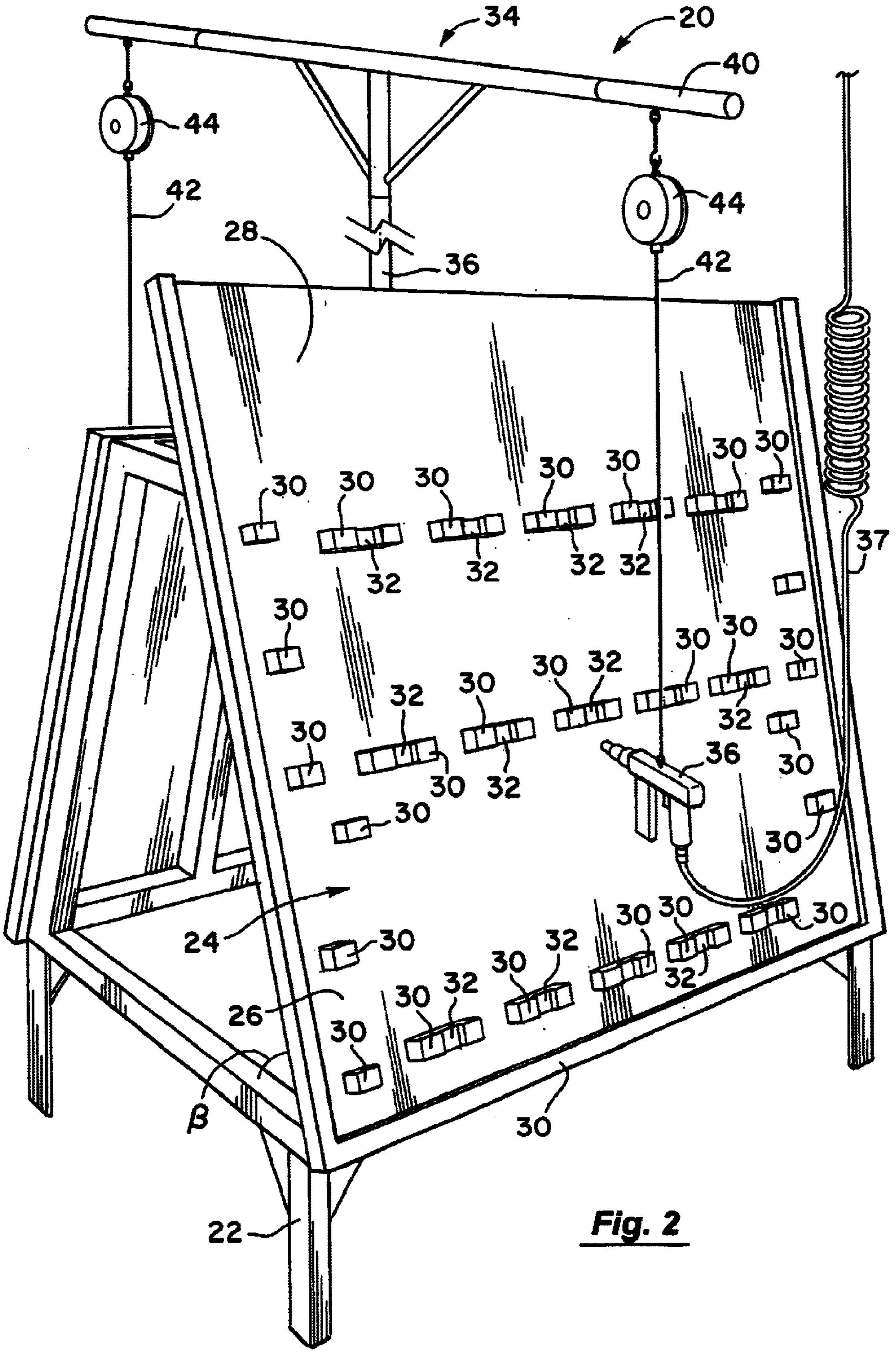
FIG. 2 is a perspective view of one embodiment of a system for constructing a box spring/foundation frame according to the invention.

Shown in FIG. 2 is a system 20 that may be used to construct frame 12 of FIG. 1. System 20 is constructed of a base 22 that holds a template 24 above the ground and at an angle relative to the ground. Base 22 is constructed of a framework that is strong enough to support template 24 and that does not substantially interfere with movement of the worker.

Template 24 is constructed of a rigid back plate 26 that is coupled to base 22. Back plate 26 has a planar surface 28 onto which boards 16 (see FIG. 3) are placed as described hereinafter. Base plate 26 may be constructed of essentially any rigid material, such as aluminum. However, other light weight, rigid materials may also be used. Disposed on base plate 26 are a plurality of template elements 30 that are positioned such that they define a plurality of slots 32 for receiving boards 16 as described hereinafter.

Base 22 holds template 24 such that surface 28 is at an angle $\beta$ in the range from about 50° to about 80° relative to the ground. This angle permits the worker to stand vertically while constructing the frame. At the same time, the angle is sufficient so that the boards do not fall off of template 24. The bottom of template 24 is also held about 10 inches to about 40 inches from the ground to reduce the amount of bending required by the worker when constructing the frame.

System 20 further includes a suspension system 34 for suspending a nail gun 36 in front of template 24. Suspension system 34 comprises a stand 38 having a laterally extending arm 40. Coupled to arm 40 is a tether 42 that hangs in front of template 24 and to which nail gun 36 is coupled. Further, an air hose 37 may be coupled to gun 36 to provide compressed air to gun 36. Also coupled to tether 42 is a counter weight or balance 44 that reduces the weight of gun 36 in the worker's hand.

Optionally, the back side of system 20 may include a second template 24' that is essentially identical to template 24. In this way, a second gun may be suspended in front of the template 24' so that two frames may be constructed at the same time, thereby greatly reducing the amount of floor space required.

Figure 3:
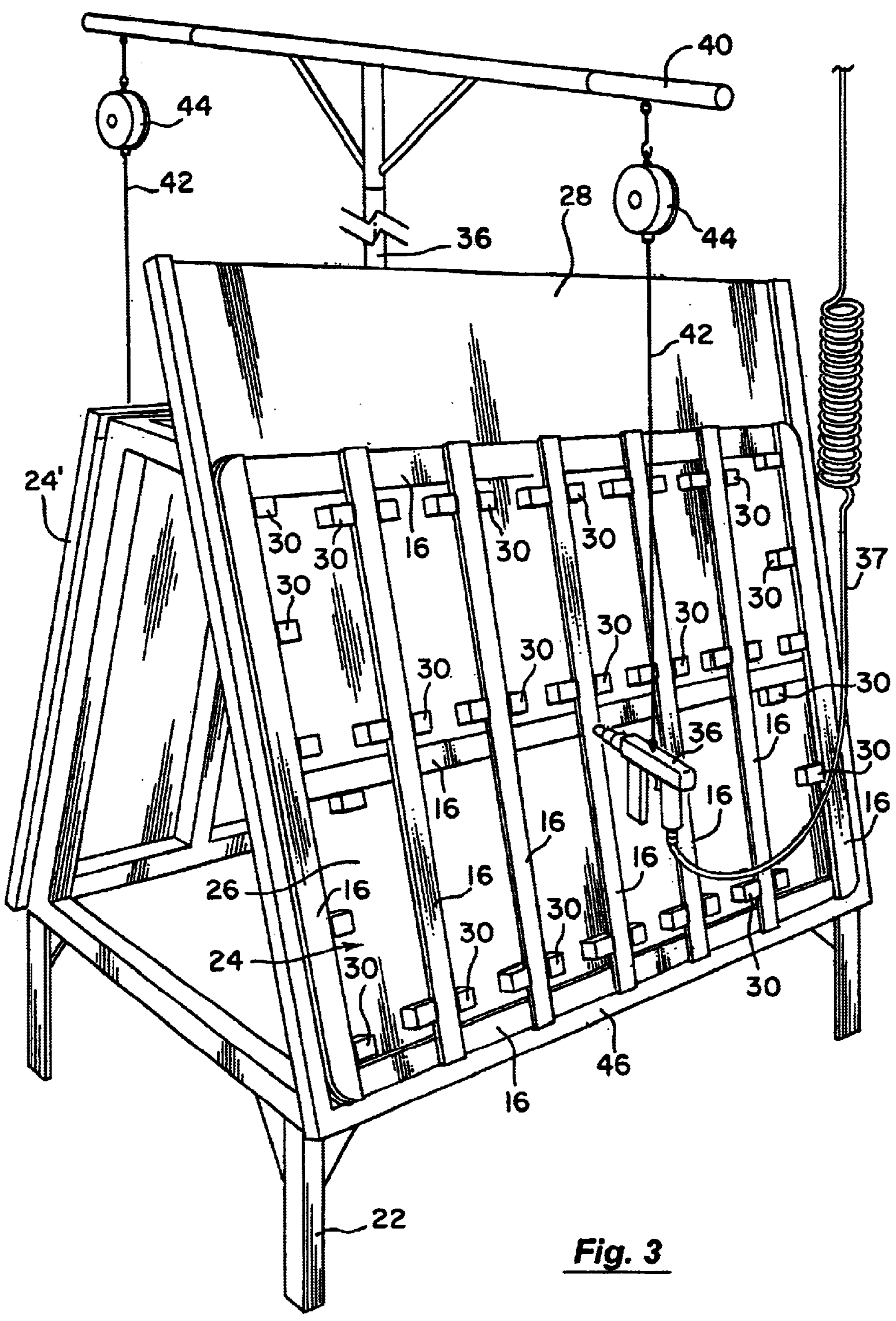
FIG. 3 illustrates the system of FIG. 2 during construction of a frame.

FIG. 3 illustrates the manner of constructing the frame of FIG. 1 using system 20 of FIG. 2. Initially three of the boards 16 are placed adjacent to surface 28 in a horizontal orientation. These boards rest on some of the template elements 30 to hold them in place. Once the horizontally-oriented boards are in place, a set of vertically oriented boards are placed over the horizontal boards. These boards are placed within slots 32 to keep them vertical. Also, one of the template elements 30 is a bottom bar 46 upon which the bottom ends of the vertically oriented boards rest to hold them on template 24.

After placing the vertically oriented boards on template 24, the worker grasps nail gun 36 and moves nail gun 36 to each location where a nail is to be shot and operates the nail gun. After the boards are nailed together, the worker may simply lift frame 12 from template 24. Because of the orientation of template 24, the workers may stand vertically for most of the construction process. Further, the worker may work quickly by having the gun suspended with a counter weight or balance so that frame 12 may be constructed more rapidly than by using an automated process. Also, by standing vertical, the worker remains in an ergonomically friendly orientation. Further, by angling template 24, significant floor space is saved so that building costs may be reduced. In some cases, an identical system may be positioned on the back side of system 20 to further increase total output using a limited amount of floor space.

Figure 4:
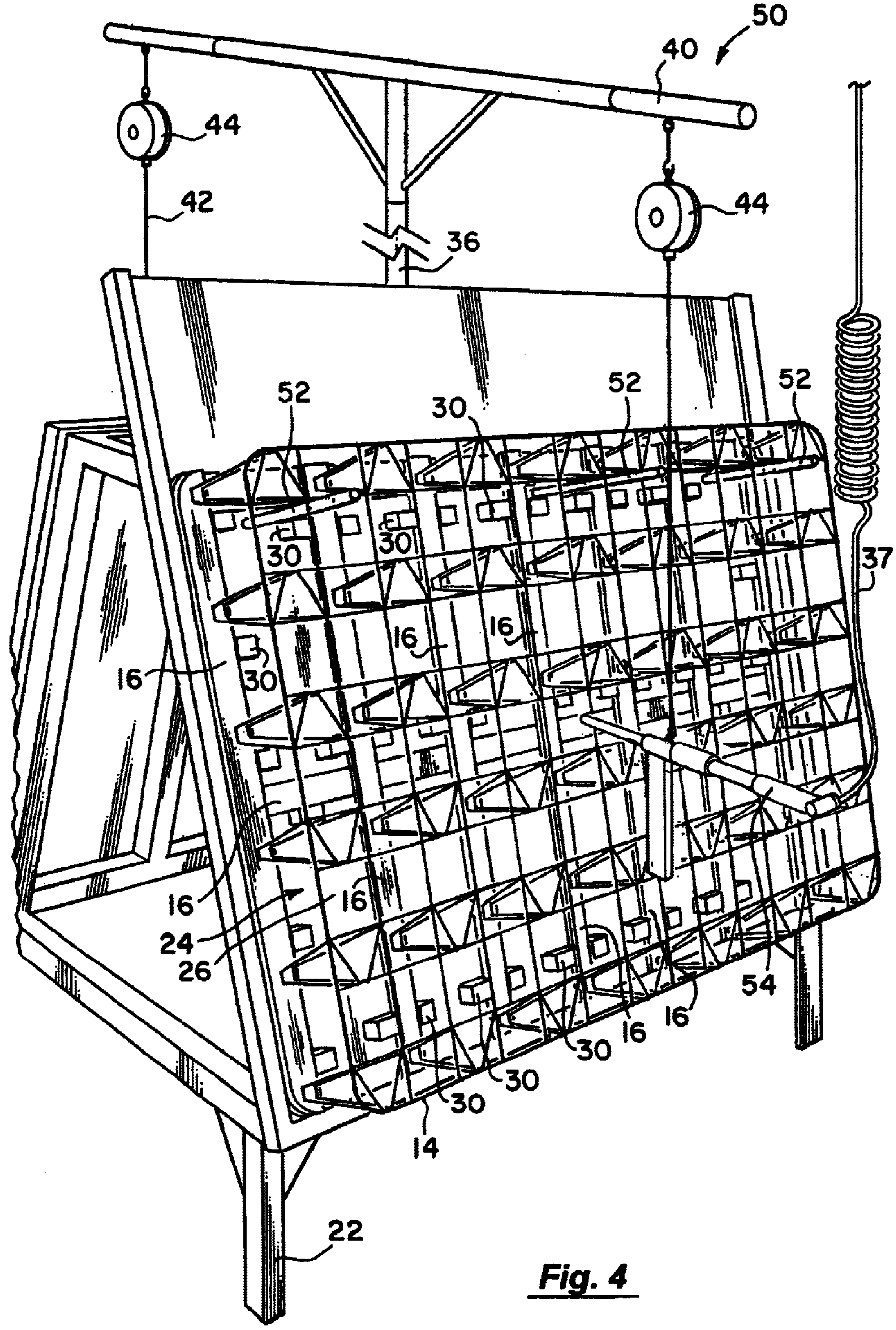
FIG. 4 illustrates another embodiment of a system for constructing a frame assembly by coupling a grid to a frame according to the invention.

To attach grid 14 to frame 12, frame 12 may be removed from template 24 and placed on a similar template that is also configured to hold grid 14 onto frame 12. Alternatively, template 24 may be configured to hold grid 14 after construction of frame 12 so that frame 12 does not need to be removed and placed on another template. Shown in FIG. 4 is a system 50 for coupling grid 14 to frame 12. System 50 is constructed of a base and a template that are constructed in a manner similar to those of system 20. Hence, for convenience of discussion, identical elements will be described using the same reference numerals in system 20. In system 50, template 24 has been modified to include extension bars 52 that are used to hold grid 14 on top of frame 12 while grid 14 is coupled to frame 12. Further, nail gun 36 is replaced with a pole gun 54 that is used to fasten grid 14 to frame 12.

In use, frame 12 is placed on template 24 (if it was not produced directly on template 24). Grid 14 is then placed on frame 12 and is held in place by bars 52. Pole gun 54 is then grasped and directed through grid 14 at various locations in order to shoot fasteners and couple grid 14 to frame 12 to form frame assembly 10. Frame assembly 10 may then be removed from template and an insulating pad and covers may be added to complete the box spring/foundation frame.

The invention has now been described in detail for purposes of clarity and understanding. However, it will be appreciated that certain changes and modifications may be practiced within the scope of the appended claims.

What is claimed is:

1. A method for constructing a box spring/foundation frame, the method comprising:

providing a template that is spaced above and angled relative to the ground, wherein the template is configured to reach between about a worker's waist and head;

placing a plurality of frame elements on the template; and manually operating a fastening machine while maintaining a generally vertical orientation to attach the frame elements with fasteners and to form a box spring/foundation frame.

2. A method as in claim 1, wherein the fastening machine comprises a nail gun that operates to shoot nails, and further comprising moving the nail gun to various locations and manually operating the nail gun to shoot nails into the frame elements while standing substantially vertical.

3. A method as in claim 1, further suspending the fastening machine above the ground using a suspension system having a tether that is coupled to the fastening machine.

4. A method as in claim 3, wherein the suspension system further includes a counter weight that is coupled to the tether.

5. A method as in claim 1, wherein the template is angled at an angle of about 50° to about 80° relative to the ground.

6. A method as in claim 1, wherein the frame elements comprise wooden boards, and further comprising placing some of the boards horizontally and some of the boards vertically on the template.

7. A method as in claim 1, further comprising placing a steel grid onto the frame while on the template and coupling the steed steel grid to the frame to form a frame assembly.

8. A method as in claim 7, further comprising providing a pole gun and coupling the steel grid to the frame using the pole gun.

9. A method as in claim 7, further comprising removing the frame assembly from the template and covering the frame assembly with an insulator pad and a fabric.

10. A box spring/foundation frame produced according to the method of claim 1.

11. A method for constructing a box spring/foundation frame assembly, the method comprising:

providing a template that is spaced above and angled relative to the ground;

placing a frame onto the template;

placing a grid onto the frame while on the template;

manually operating a fastening machine to couple the grid to the frame.

12. A method as in claim 11, wherein the fastening machine comprises a pole gun, and further comprising moving the pole gun to various locations on the grid and shooting fasteners into the frame to couple the grid to the frame.

13. A system for constructing a box spring/foundation frame, the system comprising:

a frame holding device comprising a base and a template coupled to the base, wherein the base holds the template above the ground at an angle; and a suspension system that is adapted to suspend a fastening machine above the ground and in front of the template; and a plurality of bars extending from the back that are adapted to hold a grid on the frame.

14. A system as in claim 13, wherein the suspension system comprises a tether that is adapted to be coupled to the fastening machine and a counter weight coupled to the tether.

15. A system as in claim 13, wherein the template comprises a generally planar back and a plurality template elements extending from the back that define slots for holding the frame.

16. A system as in claim 13, wherein the angle of the template relative to the ground is in the range from about 50° to about 80°.

17. A system as in claim 13, wherein the frame is constructed of wood, and wherein the grid is constructed of steel.

18. A system as in claim 13, further comprising another template coupled to the base.

* * * * *